United States Patent Office 3,015,978
Patented Jan. 9, 1962

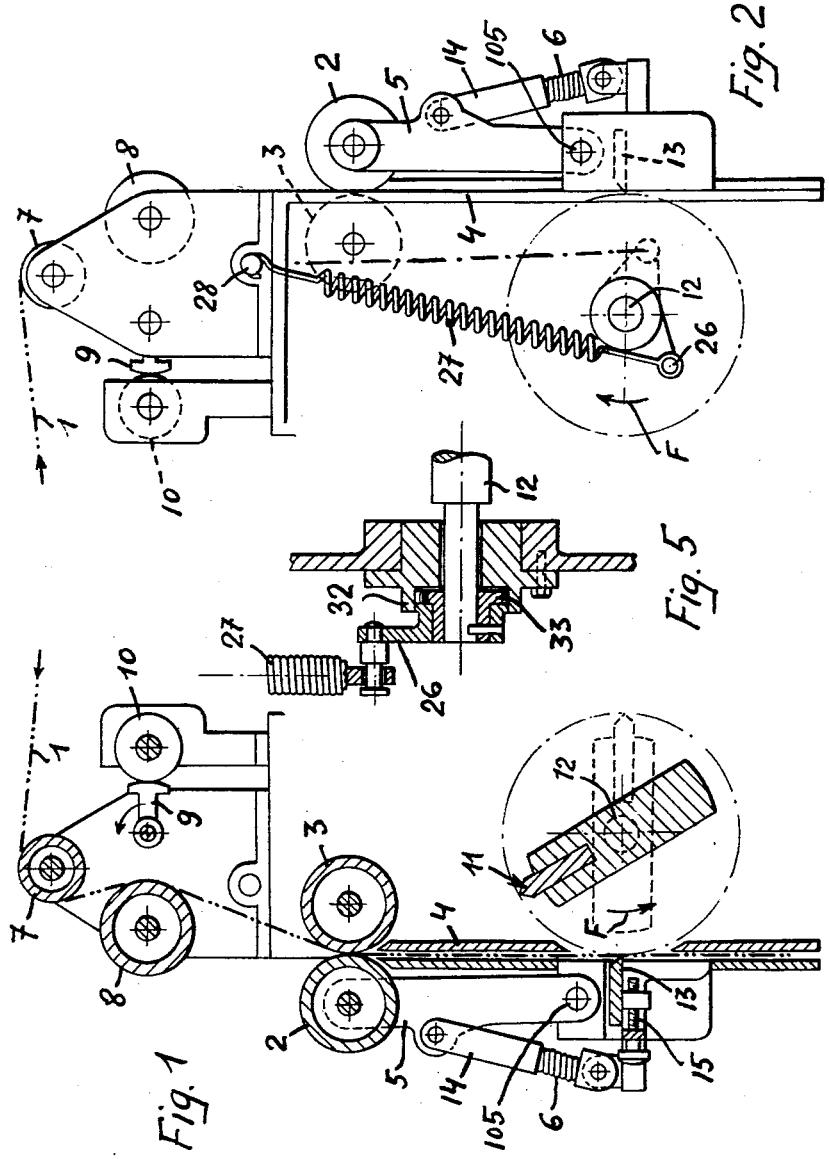

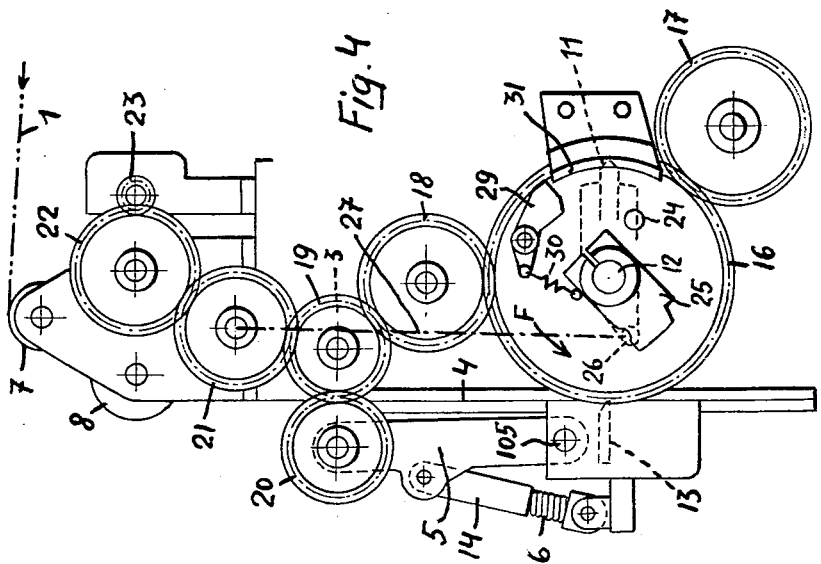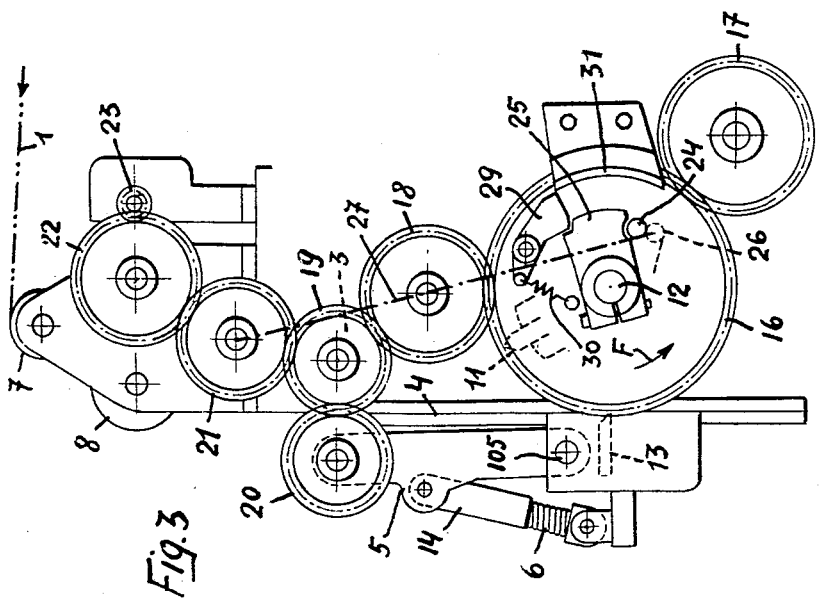

3,015,978
SPRING-STORAGE ROTARY CUTTING DEVICE
Scipione Innocenti, Bologna, Italy, assignor to S.A.S.I.B.-
S.p.A. Scipione Innocenti-Bologna, Bologna, Italy, an
Italian joint-stock company
Filed July 2, 1957, Ser. No. 669,601
Claims priority, application Italy July 11, 1956
7 Claims. (Cl. 83—324)

When a number of articles, such as cigarette boxes, delivered from a machine should be wrapped into sheet material so as to form packages of uniform size, each comprising an equal number of articles, it is convenient to employ continuous wrapping sheet material which is cut into sections of predetermined length.

As however the packaging and wrapping machine may be considered as a slow-acting machine, the sheet material must be fed substantially slowly but, in order to attain a clean cut, the said sheet material must be cut very rapidly, viz. by stroke-like actions of a cutter, acting at suitable time intervals.

This invention aims to provide a device adapted to perform this function in a very efficient and reliable manner, said device comprising a revolving cutter co-acting with a fixed counter-cutter across the cutting edge of which the wrapper sheet is fed at substantially low speed. In order however to attain the stroke-like cutting, the revolving cutter is connected to spring means and is driven for a certain part of each revolution by impelling means, which accomplish a complete revolution at constant speed at each complete cycle of the machine, but as regards the control of the revolving cutter, they serve to load said spring means whilst for the remaining part of each revolution, which corresponds to an arc of a circle passing tangentially to said counter-cutter, the said cutter is uncoupled from said constant-speed revolving impelling means and moves rapidly under the influence of the said loaded spring means along said arc of a circle, so as to strike rapidly against the paper passing over said counter-cutter, thus effecting a clean cut thereof and detaching from the continuous band a section of a predetermined length.

After this cutting action, the said revolving cutter is brought by said spring means into a position in which it is again coupled to the said continuously revolving impelling means and the cycle is thus repeated.

In order to avoid hunting of the revolving cutter under the snapping spring action, overrunning clutch means are provided, which permit the revolution of said cutter only in one direction.

Other objects and characteristic features of the invention will be apparent from the following specification of one preferred embodiment of the invention, when read in conjunction with the accompanying drawings, in which:

FIGURE 1 is a diagrammatic cross-sectional view taken vertically through, and as observed from one side of the paper feed and cutting unit of an automatic wrapping machine, for example adapted for forming packages out of a number of cigarette boxes;

FIGURE 2 is a side view in elevation of the structure shown in FIG. 1 as observed from the other side;

FIGURES 3 and 4 are side views in elevation of the structure shown in FIG. 1 and as observed from the same side, and showing the drive means for the cutting device in two different positions, and FIGURE 5 is a fragmentary cross-sectional view taken axially through an overrunning clutch drive means for the revolving cutter of said cutting device.

According to the preferred embodiment shown in the drawings, 1 indicates a continuous paper sheet which is continuously unrolled from a supply roll (not shown) by a pair of co-acting feed rollers 2 and 3 which feed same through a substantially vertical guide 4 to the cutting device proper. The feed roller 2 is mounted on a rocking supporting member 5 pivoted at 105 and is pushed against the other fixed feed roller 3 by a spring 6 acting on said supporting member 5 by means of a hinged arm 14. Ahead of the feed rollers 2, 3 the paper band 1 passes over an idle guide roller 7 and against another idle bearing roller 8 which serves as a sheet-backing member when the sheet is acted upon by a revolving stamp 9, which, after being inked by an inking roller 10, stamps the sheet 1 at regular intervals.

The cutting device proper comprises a hardened steel straight-edge revolving cutter 11 and a softer metal counter-cutter 13 adapted to co-act with said revolving cutter 11 and adjustably mounted with respect thereto as by adjusting screw 15. The revolving cutter 11 is fastened to a shaft 12 (FIGURES 1, 3 and 4) mounted in bearings 32 incorporating an overrunning clutch 33 (FIG. 5) which permit the rotation of said shaft only in the cutter-operating direction, which is the direction indicated by the arrow F. At one end of said shaft 12 a crank arm 26 is fastened (FIG. 5) to one end of a strong helical tension spring 27, the other end of which is anchored to a fixed part 28 of the machine frame.

On said shaft 12 is idly supported a gear wheel 16 which is held in position on said shaft 12 by suitable means such as a split collar and a clamp bolt (FIGS. 3 and 4), said collar being provided with a radial arm 25 extending into the path of an abutment pin 24 projecting from said gear 16. This gear 16 carries also on the same side as pin 24 a pawl-like coupling member or pawl 29 which is normally pulled by a spring 30 out of the path of the radial arm 25, but along a predetermined arc of a circle it is engaged by a fixed cam 31 and is pushed against the action of spring 30 into the path of said radial arm 25.

The gear 16 is driven by a control gear 17 at a constant speed, of one complete revolution for each complete cycle of the wrapping or like slow-acting machine, and drives in turn, through the intermediate gear 18, the gear 19 which controls the feed roller 3 (FIGURES 3 and 4). Gear 19 drives a gear 20 fixed with the other feed roller 2 and, through an intermediate gear 21 drives two gears, 22 and 23, which are in mesh with each other and are fixed with the said revolving stamp 9 and inking roller 10, respectively.

The angular position of the crank 26 and spring 27 with respect to the revolving cutter 11, and the position and angular extension of the cam sector 31 are so chosen as to effect the following operation:

When the crank 26 reaches the position as shown by dash-and-dot lines in FIGURES 2 and 4, and in which the crank, for the reasons as will be seen hereinafter, passes beyond its dead center, which corresponds to the minimum elongation of the spring 27, the revolving cutter 11 assumes an angular position past that of the fixed counter-cutter 13. This position, which will be called "rest position" is shown by dash lines in FIGURES 1 and 4. In this rest position of the cutter 11, the arm 25 is engaged by the pin 24 to form clutch means and is carried along thereby together with the cutter 11 and the crank 26 in the direction of arrow F, thereby extending or loading the spring 27. Before the crank 26 reaches its opposite dead center which corresponds to the maximum elongation of the spring 27, the pawl 29 meets the cam 31 and is shifted into the path of the radial arm 25, thus coupling the shaft 12 and cutter 11 to the gear 16. When, by continuing its revolution, the crank 26 has passed by a predetermined angle its dead center which corresponds to the maximum elongation of the spring 27 (see dash and dot position in FIGURE 3) the revolving cutter 11 has reached a position a short distance ahead of the fixed counter-cutter 13, which is shown by full lines in FIGURE 1 and by dash lines in FIGURE 3. In this position, or "snapping position," of the cutter 11, the pawl 29 leaves the cam 31 and is pulled by spring 30 out of the path of the arm 25 and thus uncouples the shaft 12 from gear 16. Then the crank 26, under the action of the spring 27 moves rapidly in the direction of the arrow F and the arm 25 leaves its driving pin 24 and is swung rapidly through a certain angle and at the same time the cutter 11 fastened to the shaft 12 is swung past the fixed cutter 13 and by meeting the sheet 1 upon the edge thereof, severs same by a clean cut.

After this rapid movement, the revolving cutter 11, due to its inertia, stops when it has reached an angular position in which the crank passes beyond its dead centre which corresponds to the maximum shortening of the spring 27 and thus promotes a partial loading of said spring, hunting being prevented by the overrunning clutch 33. The cutter 11 remains in said angular or "rest" position until the driving pin 24 again engages the radial arm 25, and drives shaft 12, crank 26 and cutter 11 in the manner described, until the said crank 26 again passes its lower dead center, and the shaft 12 is uncoupled from the gear 16 by the pawl 29, it is again allowed to move rapidly together with said cutter 11.

From the foregoing it is apparent that a cutting device has been provided in which the cutting of a continuous sheet fed at substantially slow speed by means of a revolving cutter co-acting with a fixed cutter takes place at predetermined intervals with a strokelike action, at each cycle of the operating machine, although the revolving cutter is driven by one of the means forming part of the sheet feed kinematic chain, said one means serving for shifting said cutter during a part of its revolution and tensioning at the same time a spring which, when the cutter has reached a certain position, acts to rapidly drive same over the said fixed cutter and interposed sheet which is thus severed as desired.

Of course, although the invention has been illustrated as applied to the feed and stamping part of a slow-acting operating machine, such as a packaging or wrapping machine, it may be fitted to any other operating machine in which a continuous sheet must be severed into sections of predetermined length, each of said sections forming a complete wrapper.

I claim:
1. A cutting device for severing into predetermined lengths a continuous strip of sheet material such as paper or the like, comprising means for continuously feeding a strip of sheet material through a selected path, a fixed cutter blade disposed closely adjacent and transverse said path, a revolvable cutter blade on the opposite side of said path from said fixed blade and parallel to and cooperative with said fixed blade for instantaneously shearing the full width of a sheet in said path therebetween, means for driving said strip feeding means at a constant slow speed, and means for driving said revolvable cutter blade including clutch means driven from said feed driving means and engaged during a portion of each revolution for driving said revolvable blade at the same rate as said strip driving means through a portion of each revolution, and spring means connected with said revolvable blade and tensioned during the clutch driven phase of said blade for rapidly driving said blade at a greatly accelerated rate during the portion of its movement from a point slightly ahead to a point slightly past said fixed blade.

2. A cutting device according to claim 1 comprising a shaft parallel to said fixed blade and carrying said revolvable blade, bearings freely journaling said shaft, crank means including an arm on said shaft, said clutch means including a rotatable abutment member driven by said feed driving means and engageable with said arm, and said spring means including a spring fixedly anchored at one end and connected at the other to said crank means.

3. A cutting device according to claim 2 wherein said feed driving means comprises a gear train including a gear element freely journaled on said shaft and driven at one revolution for each cycle of operation, said clutch means abutment member being carried by said gear element.

4. A cutting device according to claim 2 comprising means cooperative with said shaft and permitting only unidirectional rotation of said shaft.

5. A cutting device for severing into predetermined lengths a continuous strip of sheet material such as paper or the like, comprising means for continuously feeding a strip of sheet material through a selected path, a fixed cutter blade disposed closely adjacent and transverse said path, a shaft parallel to and on the opposite side of said path from said fixed blade, a revolvable cutter blade carried by said shaft parallel to and cooperative with said fixed blade for shearing simultaneously the full width of a sheet in said path therebetween, bearings freely journaling said shaft, crank means including an arm fastened on said shaft, a gear train for driving said strip feeding means at a constant slow speed and including a gear element freely journaled on said shaft and driven at one revolution for each cycle of operation, an abutment member carried by said gear element and engageable with said arm on one side of said arm, a pawl-like member pivotally mounted on said gear element and engageable with said arm on the side thereof opposite said abutment member to lock said arm therebetween during a period of each revolution for driving said revolvable blade at the same rate as said strip driving means, means normally biasing said pawl-like member from the path of said arm, cam means in the path of said pawl-like member for moving the latter into the path of said arm for a portion of each revolution thereof, and spring means connected with said crank means and tensioned while said arm is locked by said pawl-like member and when said cam means releases said pawl-like member rapidly driving said blade at a greatly accelerated rate during the portion of its movement past said fixed blade.

6. A cutting device according to claim 5 comprising means cooperative with said shaft and permitting only unidirectional rotation of said shaft.

7. A cutting device according to claim 6 wherein said unidirectional means comprises an overrunning clutch.

References Cited in the file of this patent
UNITED STATES PATENTS

| | | |
|---|---|---|
| 460,695 | White | Oct. 6, 1891 |
| 1,654,158 | Barber | Dec. 27, 1927 |
| 1,678,667 | Brackett et al. | July 3, 1928 |
| 1,760,411 | Humphrey | May 27, 1930 |
| 1,788,153 | Everett | Jan. 6, 1931 |
| 1,887,952 | Harney | Nov. 15, 1932 |
| 1,908,014 | Evans et al. | May 9, 1933 |
| 2,053,030 | Hall | Sept. 1, 1936 |
| 2,764,238 | Rusinoff et al. | Sept. 25, 1956 |